(12) United States Patent
Tang

(10) Patent No.: US 12,449,572 B2
(45) Date of Patent: Oct. 21, 2025

(54) MIRROR CAPABLE OF REPLACING LIGHT SOURCE ASSEMBLIES

(71) Applicant: ZHONGSHAN JINGXIAN PHOTOELECTRIC TECHNOLOGY CO., LTD., Zhongshan (CN)

(72) Inventor: Jingchuan Tang, Zhongshan (CN)

(73) Assignee: ZHONGSHAN JINGXIAN PHOTOELECTRIC TECHNOLOGY CO., LTD., Zhongshan (CN)

( * ) Notice: Subject to any disclaimer, the term of this patent is extended or adjusted under 35 U.S.C. 154(b) by 324 days.

(21) Appl. No.: 18/454,396

(22) Filed: Aug. 23, 2023

(65) Prior Publication Data

US 2025/0012952 A1  Jan. 9, 2025

(51) Int. Cl.
| | |
|---|---|
| *G02B 5/08* | (2006.01) |
| *F21V 21/005* | (2006.01) |
| *F21V 23/06* | (2006.01) |
| *G02B 7/182* | (2021.01) |
| *G02B 27/00* | (2006.01) |
| *F21W 131/302* | (2006.01) |

(52) U.S. Cl.
CPC ............. *G02B 5/08* (2013.01); *F21V 21/005* (2013.01); *F21V 23/06* (2013.01); *G02B 7/1824* (2013.01); *G02B 27/0012* (2013.01); *F21W 2131/302* (2013.01)

(58) Field of Classification Search
CPC ..... G02B 27/0012; G02B 5/08; G02B 7/1824
See application file for complete search history.

(56) References Cited

U.S. PATENT DOCUMENTS

| | | | |
|---|---|---|---|
| 6,864,315 B1* | 3/2005 | Hakuta | C08L 23/16 525/105 |
| 2012/0189329 A1* | 7/2012 | Tamaki | G03G 15/2039 399/82 |
| 2025/0021048 A1* | 1/2025 | Chen | G03G 21/1652 |
| 2025/0126233 A1* | 4/2025 | Yan | H04N 9/3161 |

* cited by examiner

*Primary Examiner* — Van N Chow
(74) *Attorney, Agent, or Firm* — HOWARD M COHN and Associates, LLC

(57) ABSTRACT

A mirror capable of replacing light source assemblies, related to a technical field of mirrors, including a mirror body, at least one sliding rail, light source assemblies, and a driving power supply. The at least one sliding rail is disposed at one side of the mirror body, the light source assemblies slide in the at least one sliding rail, and the driving power supply is disposed on a back portion of the mirror body. Each of the light source assemblies further includes lamps, first electrifying connectors, and two conductive metal sheets, the first electrifying connectors are matched with the at least one sliding rail and slide in the at least one sliding rail, and the two conductive metal sheets are disposed on an inner wall of the at least one sliding rail and are electrically connected with the driving power supply.

18 Claims, 5 Drawing Sheets

MIRROR CAPABLE OF REPLACING LIGHT SOURCE ASSEMBLIES

TECHNICAL FIELD

The present disclosure relates to a technical field of mirrors, and in particular to a mirror capable of replacing light source assemblies.

BACKGROUND

Currently, in order to meet requirements of checking appearance, making up, or using in a dark environment, a mirror generally provides an annular light supplementing lamp on a periphery to achieve lighting and lighting supplementing, which is convenient for users to use. However, the annular light supplementing lamp and the mirror are fixed, which cannot meet requirements of multi-angle light projection of the mirror, and also cannot replace light assemblies according to requirements of different users. Moreover, if lamp beads on the annular light supplementing lamp are damaged, the users cannot disassemble and replace a new lamp.

SUMMARY

The present disclosure aims to overcome above defects in the prior art and provides a mirror capable of replacing light source assemblies, which solve technical problems that current mirrors cannot meet requirements of multi-angle light projection, and also cannot replace light assemblies according to requirements.

In order to achieve above aims, the present disclosure provides a mirror capable of replacing light source assemblies, including a mirror body, at least one sliding rail, light source assemblies, and a driving power supply. The at least one sliding rail is disposed at one side of the mirror body, the light source assemblies slide in the at least one sliding rail, and the driving power supply is disposed on a back portion of the mirror body. Each of the light source assemblies further includes lamps, first electrifying connectors, and two conductive metal sheets, the first electrifying connectors are matched with the at least one sliding rail and slide in the at least one sliding rail, and the two conductive metal sheets are disposed on an inner wall of the at least one sliding rail and are electrically connected with the driving power supply. First conductive points are disposed on each of the first electrifying connectors, and the first conductive points are in conduction with each of the two conductive metal sheets. When the first electrifying connectors are matched in the at least one sliding rail, the first conductive points are in conduction with the two conductive metal sheets.

Furthermore, the driving power supply includes a power supply body and a second electrifying plug, the second electrifying plug is electrically connected to the power supply body, second conductive points are disposed on the second electrifying plug, and the second conductive points are in conduction with each of the two conductive metal sheets.

Furthermore, each of the first conductive points includes a first positive electrode conductive point and a first negative electrode conductive point, each of the second conductive points includes a second positive electrode conductive point and a second negative electrode conductive point, and the two conductive metal sheets include a first conductive metal sheet and a second conductive sheet. The first positive electrode conductive point of the first conductive points and the second positive electrode conductive point of the second conductive points are in conduction with the first conductive metal sheet. The first negative electrode conductive point of the first conductive points and the second negative electrode conductive point of the second conductive points are in conduction with the second conductive metal sheet.

Furthermore, the two conductive metal sheets are respectively disposed on inner walls of two sides of the at least one sliding rail, the first positive electrode conductive point and the first negative electrode conductive point of the first conductive points are respectively disposed at two sides of each of the first electrifying connectors, the second positive electrode conductive point and the second negative electrode conductive point of the second conductive points are respectively disposed at two sides of the second electrifying plug.

Furthermore, the two conductive metal sheets are respectively disposed on an inner wall of one side of the at least one sliding rail, and the two conductive metal sheets are disposed in parallel. The first positive electrode conductive point and the first negative electrode conductive point of the first conductive points are both disposed at one side of each of the first electrifying connectors, the second positive electrode conductive point and the second negative electrode conductive point of the second conductive points are both disposed at one side of the second electrifying plug.

Furthermore, an intelligent control module is disposed in the driving power supply, and the intelligent control module is connected to the lamps through electricity and signals.

Furthermore, the mirror capable of replacing the light source assemblies further includes an anti-fog sheet, the anti-fog sheet is disposed at a rear end of the mirror body and is connected to the intelligent control module through the electricity and signals.

Furthermore, the at least one sliding rail is disposed at the rear end of the mirror body.

Furthermore, each of the lamps further includes a fixing bracket and at least one light source, the at least one light source is disposed on the fixing bracket and is in conduction with the first electrifying connectors, and the first electrifying connectors are disposed at one end of the fixing bracket or respectively at two ends of the fixing bracket.

Furthermore, the fixing bracket includes a bending portion and a mounting rod, the mounting rod is fixedly connected to the bending portion and is configured to fix the at least one light source, and the first electrifying connectors are fixedly connected to the bending portion, which is convenient for electrically connecting the at least light source with the first electrifying connectors, and is further convenient for mounting the at least light source.

Furthermore, the at least one light source is capable of emitting lights of at least three colors, which is convenient for meeting requirements of different users.

Furthermore, light strips are attached to a periphery of the mirror body, thereby projecting lights in various colors and different directions.

Furthermore, the light strips are in any one of chip on board (COB) type, red-green-blue color changing (RGBCCT) type, red-green-blue-white (RGBW) type, red-green-blue (RGB) type, and color changing (CCT) type.

Furthermore, a magnet is disposed at a bottom portion of each of the first electrifying connectors, and an iron sheet is disposed at a bottom portion of the at least one sliding rail.

Furthermore, a first fixing groove is defined at the bottom portion of the at least one sliding rail, and the iron sheet is disposed in the first fixing groove.

Furthermore, second fixing grooves are defined on side surfaces of an inner wall of the at least one sliding rail, and the two conductive metal sheets are respectively disposed in the second fixing grooves.

Furthermore, the at least one sliding rail is an aluminum component, and an insulating layer is disposed on a surface of the at least one sliding rail.

Furthermore, a hanging fixing groove is defined at a bottom portion of the at least one sliding rail, and the at least one sliding rail is located at a top portion of the mirror body.

Compared with the prior art, beneficial effects the present disclosure are as followings.

First, through sliding the first electrifying connectors on the at least one sliding rail, the lamps may be replaced and positions of the lamps may further by adjusted. Moreover, in a process of sliding, the at least one sliding rail and the first electrifying connectors are always magnetically attracted, and the at least one sliding rail and the first electrifying connectors may be fixed after sliding the first electrifying connectors in place. The present disclosure is simple in structure, convenient in use, easy to disassemble, and further convenient for maintenance and repair.

Second, the two conductive metal sheets are disposed at inner sides of the at least one sliding rail, the first conductive points are disposed at two sides of each of the first electrifying connectors, and the second conductive points are disposed at two sides of the second electrifying plug. The lamps are electrically connected to the driving power supply through the first conductive points, the second conductive points, and the two conductive metal sheets. In the present disclosure, different lamps may be electrically conductive only through one driving power supply, which is convenient for illumination of the lamps.

Third, each of the lamps includes the fixing bracket and the at least one light source, the at least one light source is disposed on the fixing bracket. The first electrifying connectors are disposed at one end of the fixing bracket or respectively at two ends of the fixing bracket. The fixing bracket includes the bending portion and the mounting rod, the mounting rod is fixedly connected to the bending portion and is configured to fix the at least one light source. The first electrifying connectors are fixedly connected to the bending portion, the bending portion and the mounting rod enable the at least one light source to locate at a front end of the mirror body. Therefore, the at least one light source provides lighting, light supplementing, etc. when the users use the mirror. In addition, the mounting rod may be vertically disposed or horizontally disposed, and when there is only sliding rail being vertically or horizontally disposed on the back portion of the mirror body, a position of the at least one light source on the mirror body may be adjusted through replacing different mounting rods.

BRIEF DESCRIPTION OF DRAWINGS

In order to more clearly illustrate embodiments of the present disclosure or technical solutions in the prior art, drawings that need to be used in the embodiments or the prior art are briefly described below, and it is obvious that the accompanying drawings in following description are some embodiments of the present disclosure, and those who skilled in the art may obtain other drawings according to these drawings without involving any inventive effort.

Figure 1:
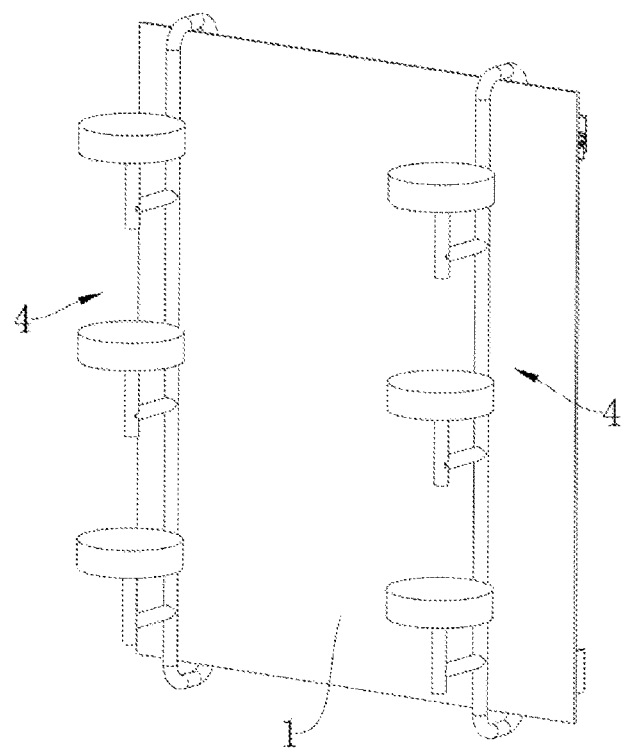
FIG. 1 is a structural schematic diagram of a mirror capable of replacing light source assemblies according to one embodiment of the present disclosure.
Figure 2:
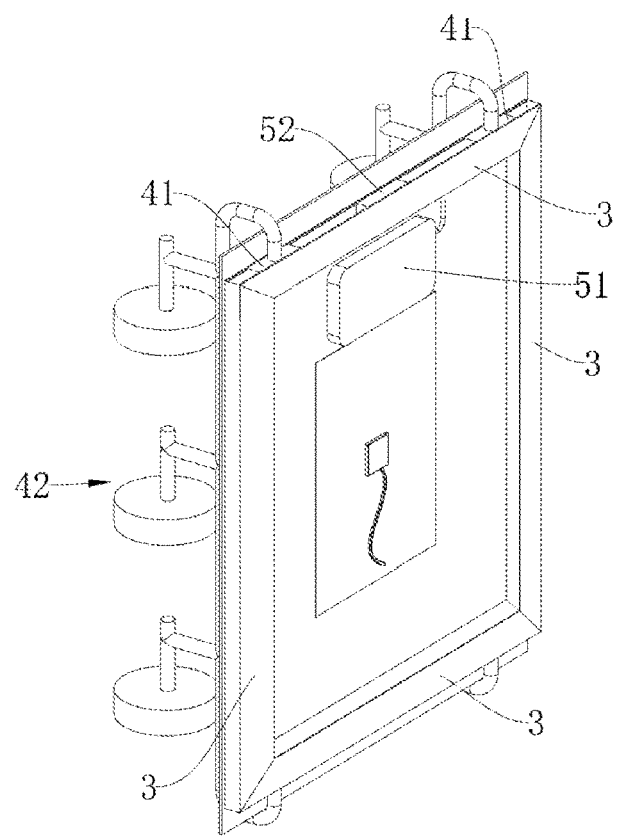
FIG. 2 is a structural schematic diagram of the mirror capable of replacing the light source assemblies shown in another representation angle according to one embodiment of the present disclosure.
Figure 3:
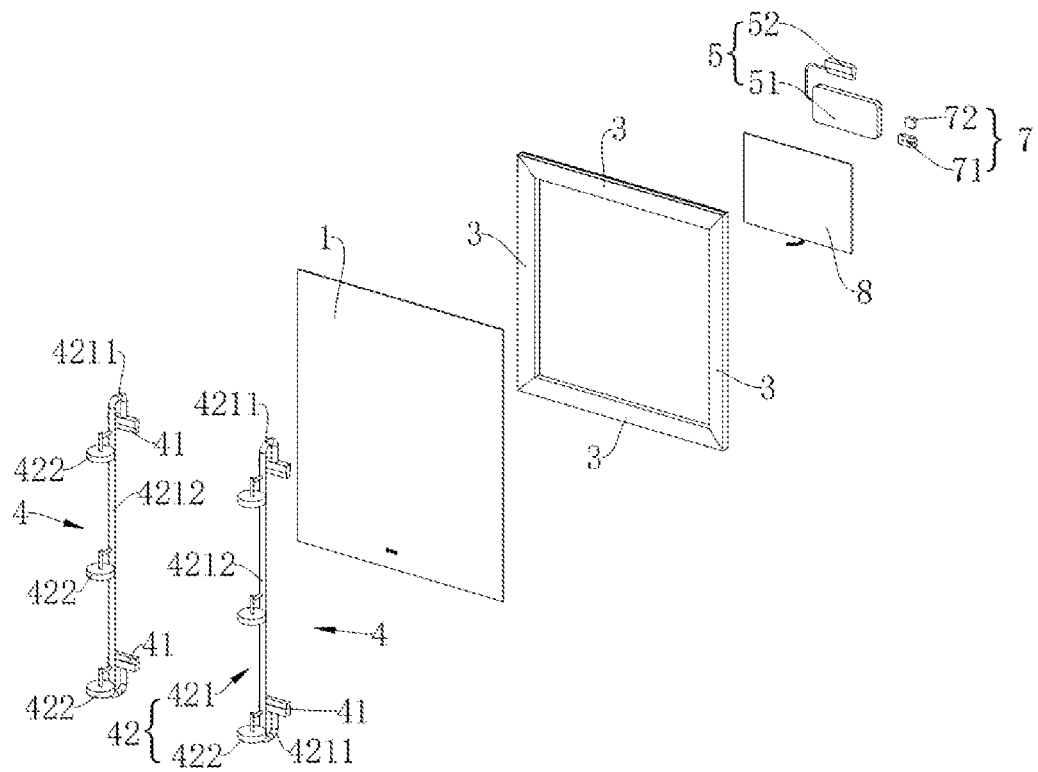
FIG. 3 is an exploded schematic diagram of the mirror capable of replacing light source assemblies according to one embodiment of the present disclosure.
Figure 4:
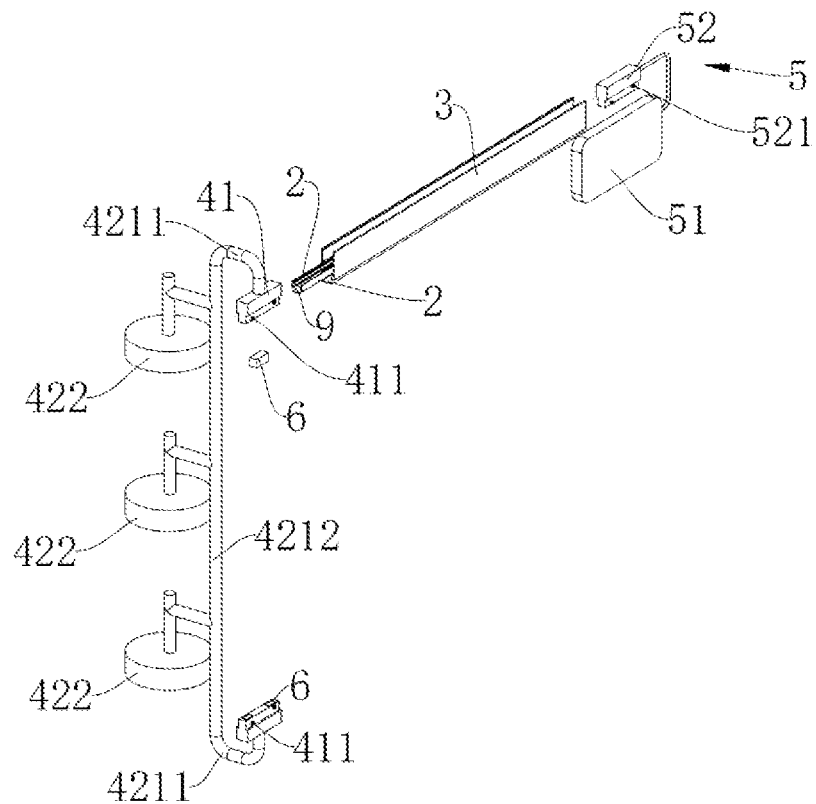
FIG. 4 is an assembly schematic diagram of a light source assembly, a sliding rail, conductive metal sheets, and a driving power supply according to one embodiment of the present disclosure.
Figure 5:
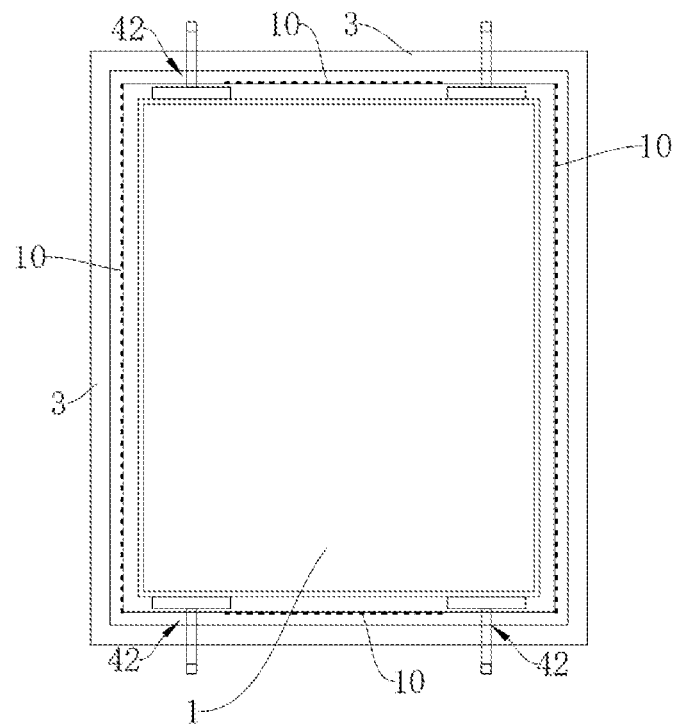
FIG. 5 is a schematic diagram of a front view of the mirror capable of replacing the light source assemblies according to one embodiment of the present disclosure.
Figure 6:
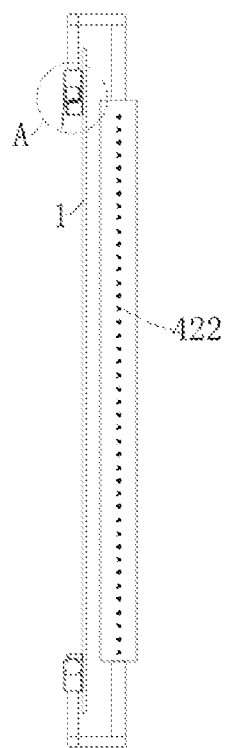
FIG. 6 is a schematic diagram of a side view of the mirror capable of replacing the light source assemblies according to one embodiment of the present disclosure.
Figure 7:
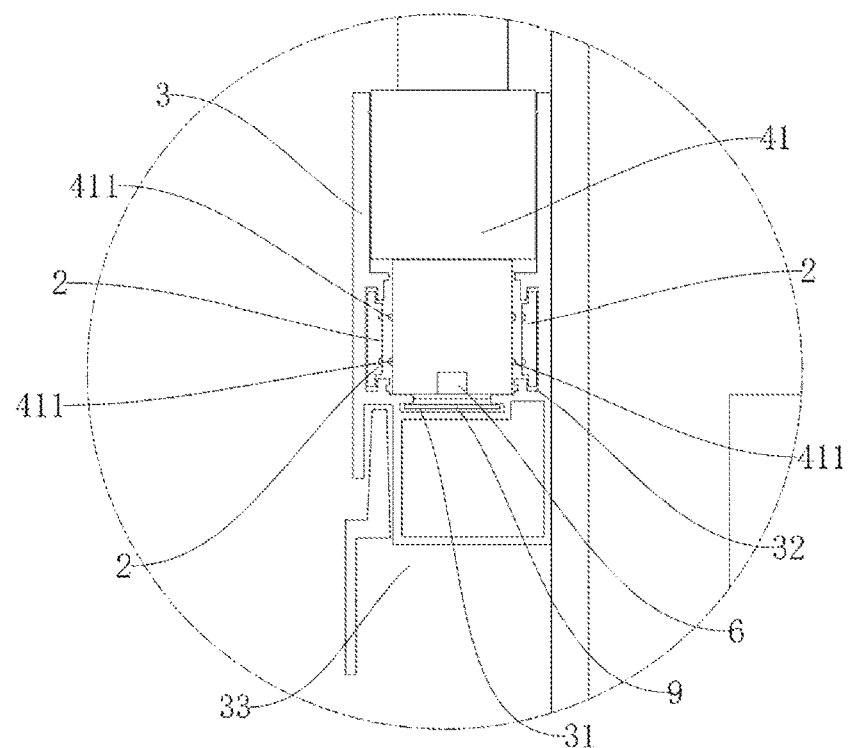
FIG. 7 is a partial enlarged schematic diagram of portion A shown in FIG. 6.

REFERENCE NUMERALS IN THE DRAWINGS 1. mirror body; 2. conductive metal sheet; 3. sliding rail; 31. first fixing groove; 32. second fixing groove; 3. hanging fixing groove. 4. light source assembly; 41. first conductive connector; 411. first conductive point; 42. lamp; 421. fixing bracket; 4211. bending portion; 4212. mounting rod; 422. light source; 5. driving power supply; 51. power supply body; 52. second electrifying plug; 521. second conductive point; 6. magnet; 7. intelligent control module; 71. light control module; 72. anti-fog control module; 8. anti-fog sheet; 9. iron sheet; 10. light strip.

DETAILED DESCRIPTION

Technical solutions in embodiments of the present disclosure are clearly and completely described below with reference to accompanying drawings in the embodiments of the present disclosure. All other embodiments obtained by those who skilled in the art based on the embodiments of the present disclosure without creative efforts shall fall within protection scopes of the present disclosure.

It should be noted that all directional indications in the embodiments of the present disclosure, such as up, down, left, right, front, back, etc., is only used to explain relative position relationships, motion situations, etc. between components under a certain specific posture (as shown in the drawings), and if the specific posture changes, the directional indication also changes accordingly.

In the present disclosure, unless expressly specified and limited thereto, the terms "connected", "fixed", etc. should be broadly understood, for example, "fixed" may be a fixed connection or a detachable connection, or may be integrated; "fixed" may also be a mechanical connection or an electrical connection; "fixed" may further be a direct connection or an indirect connection by means of an intermediate medium, may be a connection between two components or an interaction relationship between two component, unless explicitly defined otherwise. For those who skilled in the art, the specific meanings of the above terms in the present disclosure may be understood according to specific situations.

In addition, if the embodiments of the present disclosure relate to descriptions such as "first" and "second", the descriptions of "first", "second", etc. are only used for descriptive purposes, and cannot be understood as indicating or implying their relative importance or implicitly indicating the number of indicated technical features. Thus, the features defined with "first" and "second" may explicitly or implicitly include at least one of the features. In addition, the meaning of "and/or" appearing in the entire text includes three parallel solutions, and taking "A and/or B" as an example, "A and/or B" includes solution A, or solution B, or solutions A and B satisfied at the same time. In addition, the technical solutions between the various embodiments may be combined with each other, but must be under a basis that those who skilled in the art are capable of implementing, and when the combination of the technical solutions is contradictory or cannot be implemented, it should be considered that the combination of the technical solutions does not exist, nor is within the protection scopes of the present disclosure.

First Embodiment

As shown in FIGS. 1-7, the present disclosure provides a mirror capable of replacing light source assemblies, including a mirror body 1, two conductive metal sheets 2, at least one sliding rail 3, light source assemblies 4, and a driving power supply 5. The at least one sliding rail 3 is disposed at one side of the mirror body 1, the light source assemblies 4 slide in the at least one sliding rail 3, and the driving power supply 5 is disposed on a back portion of the mirror body 1. The two conductive metal sheets 2 are disposed on an inner wall of the at least one sliding rail 3 and are electrically connected with the driving power supply 5. Furthermore, second fixing grooves 32 are defined on side surfaces of an inner wall of the at least one sliding rail 3, and the two conductive metal sheets 2 are respectively disposed in the second fixing grooves 32, which is convenient for mounting and fixing the second fixing groves 32. In the embodiment, the at least one sliding rail 3 is an aluminum component, an insulating layer is disposed on a surface of the at least one sliding rail 3, and the at least one sliding rail 3 being integrally formed is manufactured through an extrusion molding process, which is convenient for process and manufacture. Moreover, the aluminum sliding rail is light in weight, long in service life, good in metallic luster, and more attractive in appearance. In addition, the insulating layer is formed on the surface of the at least one sliding rail 3 through anodic oxidation, powder spraying, electrophoresis or electroplating, so that the at least one sliding rail 3 is insulated.

Each of the light source assemblies 4 further includes lamps 42 and first electrifying connectors 41, the first electrifying connectors 41 are matched with the at least one sliding rail 3 and slide in the at least one sliding rail 3. First conductive points 411 are disposed on each of the first electrifying connectors 41, and the first conductive points 411 are in conduction with each of the two conductive metal sheets 2. The driving power supply 5 includes a power supply body 51 and a second electrifying plug 52, the second electrifying plug 52 is electrically connected to the power supply body 51, second conductive points 521 are disposed on the second electrifying plug 52, and the second conductive points 521 are in conduction with each of the two conductive metal sheets 2. Each of the first conductive points 411 includes a first positive electrode conductive point and a first negative electrode conductive point, each of the second conductive points 521 includes a second positive electrode conductive point and a second negative electrode conductive point, and the two conductive metal sheets 2 include a first conductive metal sheet and a second conductive sheet. The first positive electrode conductive point of the first conductive points 411 and the second positive electrode conductive point of the second conductive points 521 are in conduction with the first conductive metal sheet. The first negative electrode conductive point of the first conductive points 411 and the second negative electrode conductive point of the second conductive points 521 are in conduction with the second conductive metal sheet.

In one embodiment, the two conductive metal sheets 2 are respectively disposed on inner walls of two sides of the at least one sliding rail 3, the first positive electrode conductive point and the first negative electrode conductive point of the first conductive points 411 are respectively disposed at two sides of each of the first electrifying connectors, the second positive electrode conductive point and the second negative electrode conductive point of the second conductive points 521 are respectively disposed at two sides of the second electrifying plug 52.

In one embodiment, the two conductive metal sheets 2 are respectively disposed on an inner wall of the same side of the at least one sliding rail 3, and the two conductive metal sheets 2 are disposed in parallel. The first positive electrode conductive point and the first negative electrode conductive point of the first conductive points 411 are both disposed at the same side of each of the first electrifying connectors 41, the second positive electrode conductive point and the second negative electrode conductive point of the second conductive points 521 are both disposed at the same side of the second electrifying plug 52.

According to above two structural designs, the second electrifying plug 52 is inserted into the at least one sliding rail 3, so that the second positive electrode conductive point and the second negative electrode conductive point of the second conductive points 521 are in contact with different conductive metal sheets 2, and then the first electrifying connectors 41 are inserted into the at least one sliding rail 3, so that the first positive electrode conductive point and the first negative electrode conductive point of the first conductive points 411 are in contact with a corresponding conductive metal sheet 2. Therefore, after turning on the driving power supply 5, the driving power supply 5 may be in conduction with the lamps through the second electrifying plug 52, the two conductive metal sheets 2, and the first electrifying connectors 41, so that the lamps 42 may perform illumination. Furthermore, there are at least two first positive electrode conductive points and at least two second negative electrode conductive points of the first conductive point 411, there are further at least two second positive electrode conductive points and at least two second negative electrode conductive points of the second conductive point 521, which improves stability of the first conductive points 411 and the second conductive points 521 respectively in conduction with the two conductive metal sheets 2, thereby further improving working stability of the present disclosure. Furthermore, the first electrifying connectors 41 and the second electrifying plug 52 of the present disclosure are made of plastic materials to achieve an insulating state, and the first conductive points 411 and the second conductive points 521 are preferably made of conductive metal materials, such as copper, tungsten, tin, etc.

Furthermore, a magnet 6 is disposed at a bottom portion of each of the first electrifying connectors 41, and an iron sheet 9 is disposed at a bottom portion of the at least one sliding rail 3. A first fixing groove 31 is defined at the bottom portion of the at least one sliding rail 3, and the iron sheet 9 is disposed in the first fixing groove 31. According to the present disclosure, each of the first electrifying connectors 41 and the iron sheet 9 perform magnetic attraction reaction, thereby fixing the first electrifying connectors 41 in the at least one sliding rail 3. In a process of using, the users may slide the first electrifying connectors 41 in the at least one sliding rail 3 according to requirements, thereby adjusting positions of the lamps 42 on the mirror body 1, after sliding the first electrifying connectors 41 in place, the first electrifying connectors 41 and the iron sheet 9 are magnetically attracted and fixed, and other fixing devices are not needed, which is simple in operation.

Furthermore, the mirror capable of replacing the light source assemblies further includes an anti-fog sheet 8, the anti-fog sheet 8 is disposed at a rear end of the mirror body 1. An intelligent control module 7 is disposed in the driving power supply 5, the intelligent control module 7 includes a light control module 71 and an anti-fog control module 72, the light control module 71 is connected to the lamps 42 through electricity and signals, and the anti-fog control module 72 is connected to the anti-fog sheet 8 through the electricity and signals. Specifically, the users control the light control module 71 according to actual requirements, thereby controlling the lamps 42 to emit lights of different colors, and adjusting brightness of the lights emitted by the lamps 42. When fog is formed on a surface of the mirror body 1, the users control the anti-fog control module 72 to control the anti-fog sheet 8 to heat, so that the fog on the surface of the mirror body 1 is removed, which is convenient for the users to use the mirror in different environments and places.

Furthermore, the at least one sliding rail 3 is disposed at the rear end of the mirror body 1 to increase a mounting area of the at least one sliding rail 3 and the mirror body 1, thereby improving stability of the at least one sliding rail 3.

In one embodiment, there are two sliding rails 3 respectively located at two sides of the rear end of the mirror body 1. Specifically, the two sliding rails are respectively located a top end and a bottom end of the rear end of the mirror body 1, and may also be located at a left end and a right end of the rear end of the mirror, thereby meeting different requirements of the users. Moreover, when there are two sliding rails, the first electrifying connectors are disposed at both ends of each of the lamps, the first electrifying connectors 41 are moved in the sliding rail, which is capable of improving moving stability of the lamps 42.

In one embodiment, there are four sliding rails 3 respectively located around the rear end of the mirror body 1. Specifically, the four sliding rails 3 are assembled and fixed to form a frame, and then a mounting and bearing portion for mounting the mirror body 1 is disposed in a middle of the frame, and the frame may also be designed to be of a structure adapted to a size of the mirror body 1, so that the frame is mounted on the back portion of the mirror body 1, which is beneficial for mounting and fixing the mirror body 1 and the four sliding rails 3.

Furthermore, in the present disclosure, a hanging fixing groove 33 is defined at a bottom portion of the at least one sliding rail 3, and the at least one sliding rail 3 is located at a top portion of the mirror body 1, which is convenient for hanging the mirror on walls and replacing usage scenarios through the hanging fixing groove 33.

In the present disclosure, the at least one sliding rail 3 is matched with the first electrifying connectors 41, the first electrifying connectors slide in the at least one sliding rail 3, and different lamps are replaced according to requirements, which is convenient for disassembling, replacing damaged lamps, and adjusting the positions of the lamps 42. Moreover, the iron sheet 9 is disposed in the at least one sliding rail 3, the magnet 6 is disposed in each of the first electrifying connectors 41, in a process of sliding, the at least one sliding rail 3 and the first electrifying connectors 41 are always magnetically attracted, and the at least one sliding rail 3 and the first electrifying connectors 41 may be fixed after sliding the first electrifying connectors in place, which is simple in structure and convenient in use. In addition, the two conductive metal sheets 2 are disposed at inner sides of the at least one sliding rail 3, the first conductive points 411 are disposed at two sides of each of the first electrifying connectors 41, and the second conductive points 521 are disposed at two sides of the second electrifying plug 52. The lamps 42 are electrically connected to the driving power supply 5 through the first conductive points 411, the second conductive points 521, and the two conductive metal sheets 2. In the present disclosure, according to above connection method, different lamps 42 may be electrically conductive only through one driving power supply 5, which is convenient for illumination of the lamps 42.

Second Embodiment

The present disclosure further provides a second embodiment of the mirror capable of replacing the light source assemblies. Each of the lamps 42 further includes a fixing bracket 421 and at least one light source 422, the at least one light source 422 is disposed on the fixing bracket 421, and the first electrifying connectors 41 are disposed at one end of the fixing bracket 421 or respectively at two ends of the fixing bracket 421. The remaining structures are the same as those of the first embodiment, and are not repeated.

The fixing bracket 421 includes a bending portion 4211 and a mounting rod 4212, the mounting rod 4212 is fixedly connected to the bending portion 4211 and is configured to fix the at least one light source 422, and the first electrifying connectors 41 are fixedly connected to the bending portion 4211. Specifically, the bending portion 4211 may enable the mounting rod 4212 to be in a relatively parallel state with respect to the surface of the mirror body 1, so that the at least one light source 422 is in a relatively parallel state with respect to the surface of the mirror body 1. Therefore, the at least one light source 422 provides lighting, light supplementing, etc. when the users use the mirror. The mounting rod 4212 may be vertically disposed or horizontally disposed, and when there is only sliding rail 3 being vertically or horizontally disposed on the back portion of the mirror body 1, a position of the at least one light source 422 on the mirror body 1 may be adjusted through replacing different mounting rods 4212.

Figure 8:
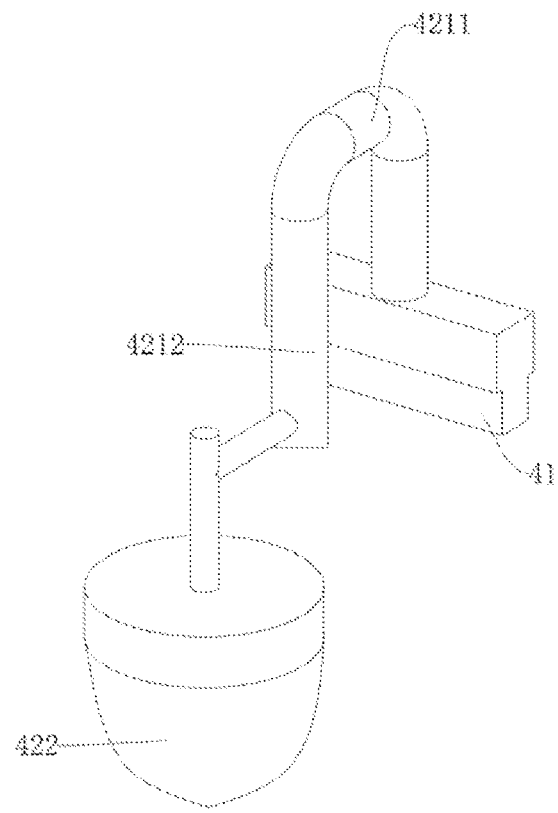
FIG. 8 is a structural schematic diagram of a first embodiment of the light source assembly according to one embodiment of the present disclosure.
Figure 9:
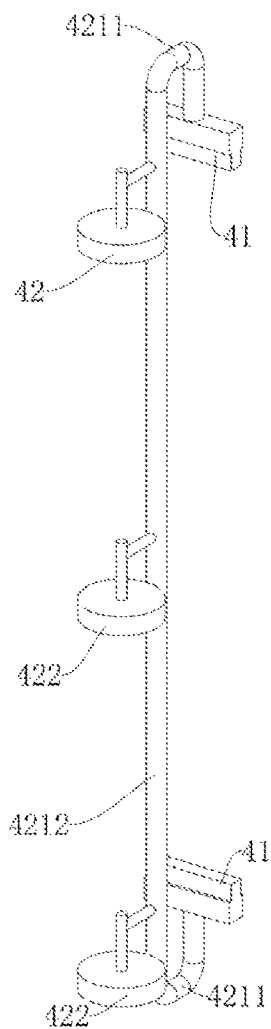
FIG. 9 is a structural schematic diagram of a second embodiment of the light source assembly according to one embodiment of the present disclosure.
Figure 10:
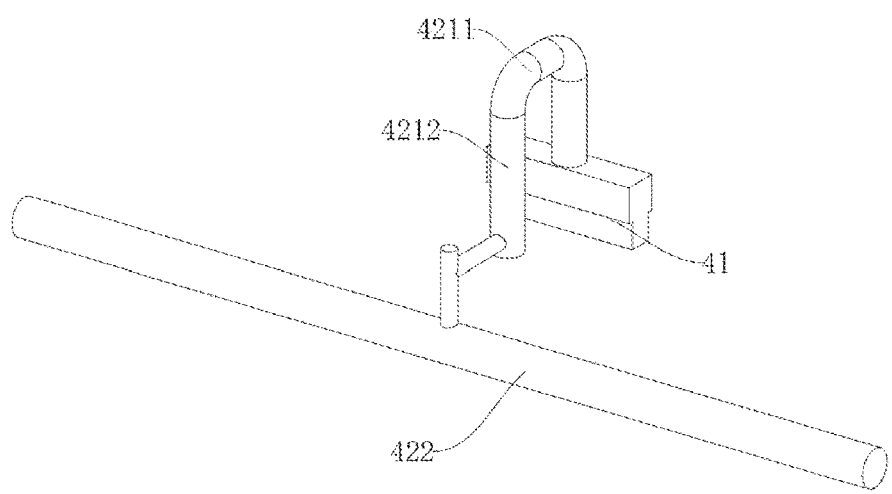
FIG. 10 is a structural schematic diagram of a third embodiment of the light source assembly according to one embodiment of the present disclosure.

In the present disclosure, the at least one light source 422 is capable of emitting lights of at least three colors, please refer to FIGS. 8-10, the present disclosure provides multiple shapes and structure of the lamps, the at least one light source 422 may be a pendant light, an LED lamp tube, etc., which is convenient to meet different requirements, and in other embodiments, the lamps 42 with different light-emitting colors, different brightness and different appearances may also be designed according to requirements, thereby improving practicability, aesthetics and multifunctionality of the mirror of the present disclosure. Furthermore, please refer to FIG. 5, light strips 10 are attached to a periphery of the mirror body, and the light strips 10 are in any one of chip on board (COB) type, red-green-blue color changing (RGBCCT) type, red-green-blue-white (RGBW) type, red-green-blue (RGB) type, and color changing (CCT) type, thereby projecting lights in various colors and different directions.

Above embodiments are preferred embodiments of the present disclosure, but the embodiments of the present disclosure are not limited by foregoing embodiments, and any other changes, modifications, substitutions, combinations, and simplification made without departing from the spirit and principle of the present disclosure should be equivalent replacement manners, which are all included within the protection scopes of the present disclosure.

What is claimed is:

1. A mirror capable of replacing light source assemblies, comprising:
    a mirror body;
    at least one sliding rail;
    light source assemblies; and
    a driving power supply;
    wherein the at least one sliding rail is disposed at one side of the mirror body, the light source assemblies slide in the at least one sliding rail, and the driving power supply is disposed on a back portion of the mirror body; each of the light source assemblies further comprises lamps, first electrifying connectors, and two conductive metal sheets, the first electrifying connectors are matched with the at least one sliding rail and slide in the at least one sliding rail, and the two conductive metal sheets are disposed on an inner wall of the at least one sliding rail and are electrically connected with the driving power supply; first conductive points are disposed on each of the first electrifying connectors, and the first conductive points are in conduction with each of the two conductive metal sheets; when the first electrifying connectors are matched in the at least one sliding rail, the first conductive points are in conduction with the two conductive metal sheets.

2. The mirror capable of replacing the light source assemblies according to claim 1, wherein the driving power supply comprises a power supply body and a second electrifying plug, the second electrifying plug is electrically connected to the power supply body, second conductive points are disposed on the second electrifying plug, and the second conductive points are in conduction with each of the two conductive metal sheets.

3. The mirror capable of replacing the light source assemblies according to claim 2, wherein each of the first conductive points comprises a first positive electrode conductive point and a first negative electrode conductive point, each of the second conductive points comprises a second positive electrode conductive point and a second negative electrode conductive point, and the two conductive metal sheets comprise a first conductive metal sheet and a second conductive sheet; the first positive electrode conductive point of the first conductive points and the second positive electrode conductive point of the second conductive points are in conduction with the first conductive metal sheet; the first negative electrode conductive point of the first conductive points and the second negative electrode conductive point of the second conductive points are in conduction with the second conductive metal sheet.

4. The mirror capable of replacing the light source assemblies according to claim 3, wherein the two conductive metal sheets are respectively disposed on inner walls of two sides of the at least one sliding rail, the first positive electrode conductive point and the first negative electrode conductive point of the first conductive points are respectively disposed at two sides of each of the first electrifying connectors, the second positive electrode conductive point and the second negative electrode conductive point of the second conductive points are respectively disposed at two sides of the second electrifying plug.

5. The mirror capable of replacing the light source assemblies according to claim 3, wherein the two conductive metal sheets are respectively disposed on an inner wall of one side of the at least one sliding rail, and the two conductive metal sheets are disposed in parallel; the first positive electrode conductive point and the first negative electrode conductive point of the first conductive points are both disposed at one side of each of the first electrifying connectors, the second positive electrode conductive point and the second negative electrode conductive point of the second conductive points are both disposed at one side of the second electrifying plug.

6. The mirror capable of replacing the light source assemblies according to claim 2, wherein an intelligent control module is disposed in the driving power supply, and the intelligent control module is connected to the lamps through electricity and signals.

7. The mirror capable of replacing the light source assemblies according to claim 6, wherein the mirror capable of replacing the light source assemblies further comprises an anti-fog sheet, the anti-fog sheet is disposed at a rear end of the mirror body and is connected to the intelligent control module through the electricity and signals.

8. The mirror capable of replacing the light source assemblies according to claim 1, wherein the at least one sliding rail is disposed at the rear end of the mirror body.

9. The mirror capable of replacing the light source assemblies according to claim 1, wherein each of the lamps further comprises a fixing bracket and at least one light source, the at least one light source is disposed on the fixing bracket and is in conduction with the first electrifying connectors, and the first electrifying connectors are disposed at one end of the fixing bracket or respectively at two ends of the fixing bracket.

10. The mirror capable of replacing the light source assemblies according to claim 9, wherein the fixing bracket comprises a bending portion and a mounting rod, the mounting rod is fixedly connected to the bending portion and is configured to fix the at least one light source, and the first electrifying connectors are fixedly connected to the bending portion.

11. The mirror capable of replacing the light source assemblies according to claim 9, wherein the at least one light source is capable of emitting lights of at least three colors.

12. The mirror capable of replacing the light source assemblies according to claim 1, wherein light strips are attached to a periphery of the mirror body.

13. The mirror capable of replacing the light source assemblies according to claim 12, wherein the light strips are in any one of chip on board (COB) type, red-green-blue color changing (RGBCCT) type, red-green-blue-white (RGBW) type, red-green-blue (RGB) type, and color changing (CCT) type.

14. The mirror capable of replacing the light source assemblies according to claim 1, wherein a magnet is disposed at a bottom portion of each of the first electrifying connectors, and an iron sheet is disposed at a bottom portion of the at least one sliding rail.

15. The mirror capable of replacing the light source assemblies according to claim 14, wherein a first fixing groove is defined at the bottom portion of the at least one sliding rail, and the iron sheet is disposed in the first fixing groove.

16. The mirror capable of replacing the light source assemblies according to claim 1, wherein second fixing grooves are defined on side surfaces of an inner wall of the at least one sliding rail, and the two conductive metal sheets are respectively disposed in the second fixing grooves.

17. The mirror capable of replacing the light source assemblies according to claim 1, wherein the at least one sliding rail is an aluminum component, and an insulating layer is disposed on a surface of the at least one sliding rail.

18. The mirror capable of replacing the light source assemblies according to claim 1, wherein a hanging fixing groove is defined at a bottom portion of the at least one sliding rail, and the at least one sliding rail is located at a top portion of the mirror body.

\* \* \* \* \*